United States Patent Office 2,766,873
Patented Oct. 16, 1956

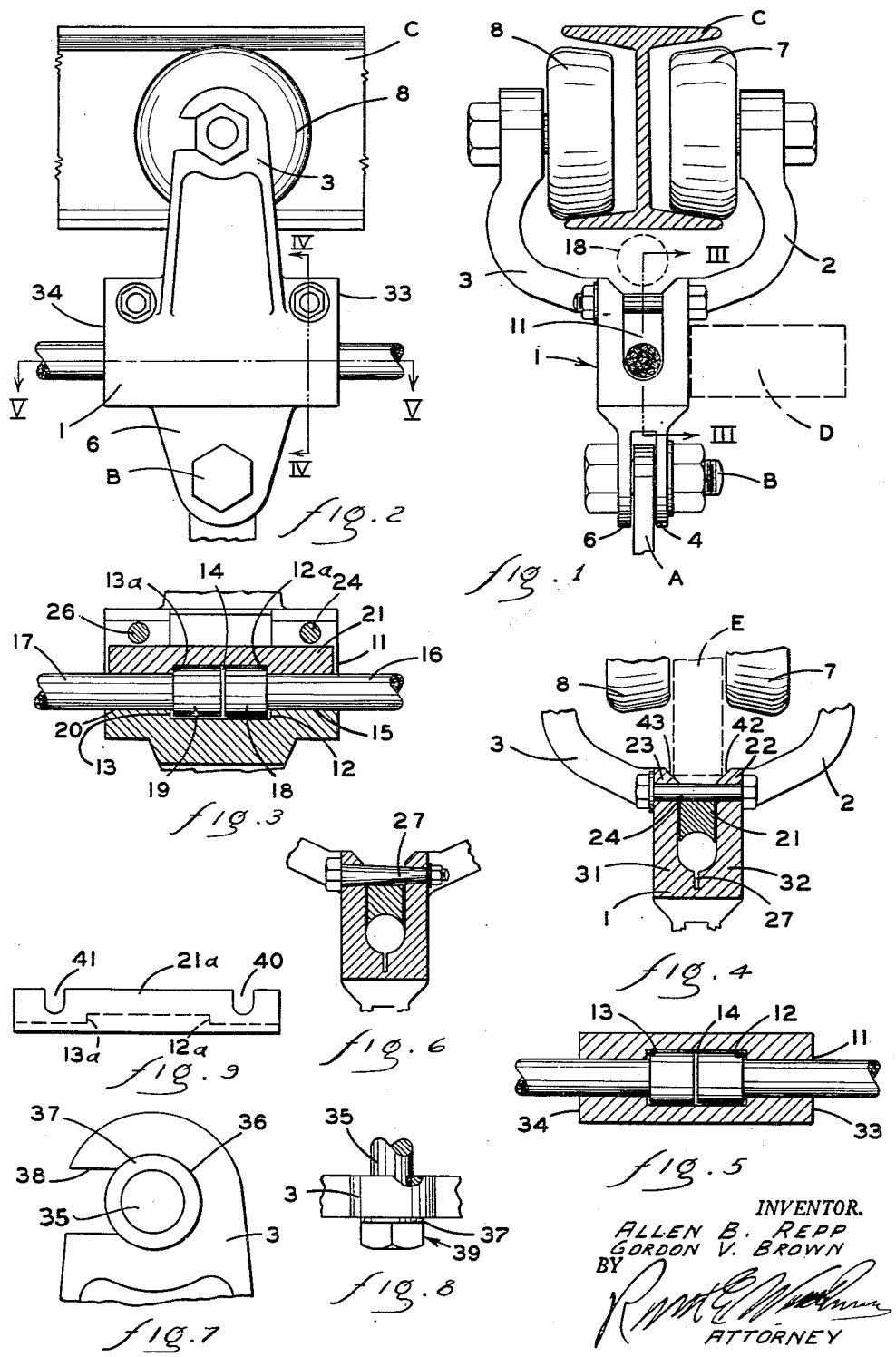

2,766,873

CABLE ENGAGING DEVICE

Gordon V. Brown, Grosse Ile, and Allen B. Repp,
Dearborn, Mich.

Application May 27, 1953, Serial No. 357,873

3 Claims. (Cl. 198—177)

This invention relates to cable conveyors and particularly to a bracket for engaging adjacent cable ends and for attaching other devices. One particular, but by no means the only, application of the invention is to a trolley assembly for an over-head rail type of cable conveyor, which assembly in addition to engaging adjacent ends of the cable supports a pair of trolley wheels and also supports a work carrier.

In the provision of a cable conveyor system, one of the most critical problems is the design of the trolley assembly inasmuch as many of the problems incident to the design and operation of cable conveyors focus at this point. The trolley assembly must be of sufficient strength to withstand the very considerable forces applied thereto by the cable, often of the order of six thousand pounds or more, it must be as light as possible to minimize the overall weight of the conveyor, it must be capable of easy and quick assembly with respect to the cable for both original installation and for maintenance purposes, it must be capable of economic manufacture and yet with a high degree of dimensional accuracy, and it must have in addition a variety of other attributes which will be familiar to those skilled in the art.

While a variety of trolley assemblies have been proposed in the past, they have all been deficient in one or more of the above stated features.

In a cable conveyor of the continuous type, most of the trolley assemblies will be adapted for engaging the portion of the cable intermediate its ends, but at least one trolley assembly will be adapted for engaging the terminal, adjacent, ends of the cable. In cable conveyors of the segmented type, the trolley assemblies will each engage adjacent ends of cable segments. These cable ends, or segment ends, as the case may be, are normally provided with an enlargement which may be a flaring of the cable itself, or solid cone driven in the end thereof, and it frequently comprises a steel band around the end of the cable and welded or swedged thereto in the trade usually called "button" which may be further held in position by a solid cone driven into the end of the cable to force it tightly against the inner surface of the steel band.

One particularly important feature in a cable conveyor, and particularly one of the segmented type, is the necessity of maintaining relatively close tolerances in the dimensions of the trolley assembly. Inasmuch as the trolley assembly is a part of the conveyor, it is well understood in the art that variations in the distance between the points at which the cable segments are held will vary the distances between trolley assemblies and thus cause the cable as a whole to fail to fit properly against the driving or guiding mechanism involving spaced teeth or lugs which are intended to engage the trolley assemblies at predetermined intervals. It is, therefore, of particular importance to provide a trolley assembly which can be readily held to close dimensional tolerances without incurring excessive cost.

Accordingly, a principal object of the invention is to provide a trolley assembly for holding adjacent cable ends of a cable conveyor, of either the continuous cable or segmented cable type, which trolley assembly will be positive in its engagement of the cable ends and yet capable of easy and rapid assembly therewith.

A further object of the invention is to provide a trolley assembly, as aforesaid, which will be capable of fabrication within close dimensional tolerances without incurring excessive cost.

A further object of the invention is to provide a trolley assembly, as aforesaid, which will be strong and sturdy.

A further object of the invention is to provide a trolley assembly, as aforesaid, in which the surfaces which are to be held to close dimensional tolerances may be easily machined.

A further object of the invention is to provide a trolley assembly, as aforesaid, which can be made in a single unit excepting only for a locking member and nut and bolt assemblies holding the locking member in operational position.

A further object of the invention is to provide a trolley assembly, as aforesaid, which can receive joggle rollers at a point so that the center of force exerted thereby will pass substantially through the axis of the cable.

A further object of the invention is to provide a cable gripping assembly for a cable conveyor which is applicable to either an over-head type of conveyor or to a floor type of conveyor.

A further object of the invention is to provide a trolley assembly in which the trolley wheels may readily be removed without removing the trolley assembly from the track.

A further object of the invention is to provide a cable gripping assembly which, when applied to an over-head trolley system, permits insertion of the cable therein, and its removal therefrom, without the necessity of removing the assembly from operating position on the track.

A further object of the invention is to provide a cable engaging assembly, as aforesaid, to which a trip-bar or other fixture may be applied to an accurately positioned surface, as a driving face thereof, readily and without affecting its driving characteristics.

Other objects and purposes of the invention will become apparent to persons acquainted with equipment of this general type upon a reading of the following disclosure and study of the accompanying drawings.

In the drawings:

Figure 1 is an end view of our invention as applied to a trolley system and showing also an over-head supporting rail in section.

Figure 2 is a side view of the cable engaging device shown in Figure 1.

Figure 3 is a section taken on the line III—III of Figure 1.

Figure 4 is a section taken on the line IV—IV of Figure 2.

Figure 5 is a section taken on the line V—V of Figure 2.

Figure 6 is a sectional view similar to Figure 4, showing a modification.

Figure 7 is a fragmentary detail of the shaft mounting means, not showing the nut.

Figure 8 is a top, partially broken, view of Figure 7, showing the nut.

Figure 9 is a side view of a modified locking member.

*General description*

The invention consists of a rectangular body part having a generally U-shaped opening therein, said opening also defining internal shoulders for engagement of the enlarged ends of the cables, and a cap or lock member for entering between the arms of the U and holding said cable ends in position. Any convenient means, as bolts, may be employed to hold the lock member is position. Suitable trolley supporting arms, or other support means, may, if desired, extend from one portion of said body part and work carrier engaging means may extend from another portion of said body part.

*Detailed description*

Turning now to the drawings, there is shown for illustrative purposes a type of cable engaging device embodying the invention and associated with an over-head, monorail, type of cable conveyor. The cable engaging body part 1 in this embodiment supports a pair of upwardly extending trolley arms 2 and 3 and a pair of downwardly depending work carrier supports 4 and 6. A work carrier support "A" may be held therein by a nut and bolt assembly "B" in the usual manner. Trolley wheels 7 and 8 are supported near the upper ends of said trolley arms 2 and 3, respectively, for engagement of the rail "C" in the usual manner. The rail "C" may be of any conventional nature and is here, for convenience, shown as an I-beam.

The body part 1 has a generally U-shaped central opening 11 extending longitudinally therethrough, having semi-cylindrical bottom surfaces, and having internal shoulders 12 and 13 adjacent respectively opposite ends with an enlarged central chamber 14 being intermediate said shoulders. The respectively adjacent cable ends 16 and 17, provided with the buttons 18 and 19, respectively, may be either the ends of a single continuous cable which are by the device of the invention to be fastened together or they may be the adjacent ends of a pair of segments in a segmented type of cable conveyor. Said cables are placed in the U-shaped opening 11 with their respective buttons aligned on a common axis within the central chamber 14 and abutting the shoulders 12 and 13.

The locking member 21 has end portions which are of width to be received within the end portions 15 and 20 of the central opening 11 and a central portion fitting within the central chamber 14 of the central opening 11, all with a substantial clearance for reasons appearing hereinafter. The underside of said locking member is curved substantially around the axis of said cables and upon radii such that the said curved walls will provide substantially continuations of the bottom, semi-cylindrical, parts of the end portions 15 and 20 of said central opening and of the central chamber 14. Shoulders 12a and 13a of the locking member are also substantial continuations of the shoulders 12 and 13. Thus, when said locking member is in position against the cable, both the cables and the buttons will be closely engaged throughout their entire respective circumferences and they will each be solidly seated against shoulders 12 and 12a and 13 and 13a throughout their entire circumferences. Bolts 24 and 26 extend between the arms 22 and 23 at each respective end of the body part 1 for holding the locking member 21 firmly in position. By using the form of locking member 21a shown in Figure 9, the bolts 24 and 26 are received through the slots 40 and 41 for the purpose of aligning the shoulders 12 and 12a and the shoulders 13 and 13a and for the purpose of positively preventing endwise movement of the locking member during operation.

A slot 27 may, if desired, be provided in the lower portion of the body part 1 for extending the length of the arms 22 and 23 if desired to improve the characteristics of the gripping action by said arms against the cable ends.

It will be noted that with the locking strip 21 of slightly less width than the diameter of the cable, the action of drawing the arms 22 and 23 towards each other by the nut and bolt assemblies 24 and 26 will compress the cable and tend to distort it into a slightly elliptical shape with its long axis in a direction parallel to said arms. This will provide sufficient pressure against the locking member 21 to force it solidly against the bolts 24 and 26 and thereby assure the gripping of said cable around its entire circumference. Alternatively, if desired, a tapered bolt 27 may be used as illustrated in Figure 6, for positively urging said locking member against the cable and thereby further insuring the solid engagement of said locking member 21 between said bolt and the cable.

As best illustrated in Figure 4, the parts are so dimensioned that with the trolley assembly in operating position with respect to the track "C" there is sufficient space in the area between the lower surface of said track and the arms 2 and 3 to permit the entry therebetween of the buttons associated with said cable. The broken line circle 18 in Figure 1 indicates the entering position of the button 18. It thus becomes plain that the cable end may be assembled into position with respect to the trolley assembly or removed therefrom without removing said trolley from the track. This is of particular importance in segmented types of cable conveyors wherein it is sometimes desired to replace a single segment and it is desired to do so without removing the trolley assemblies from the track.

The beveled, or otherwise recessed, surfaces 42 and 43 also provide a seat for receiving a guiding wheel, as indicated at "E" in Figure 4, where same may be used between rail ends, such as over a dripping tank.

The sides 31 and 32 of the body part 1 are made parallel to each other and substantially perpendicular to the ends 33 and 34 thereof for engagement with joggle rollers of which one is indicated by broken lines at "D" in Figure 1. Thus, the force supplied to the cable conveyor by the joggle rollers is substantially aligned with the cable so that tilting of the trolley assembly at a corner which now exists where the joggle rollers are applied to the trolley assembly at a point either above or below the cable, is substantially prevented. Thus, the excessive wearing of the rollers and/or the rail and the joggling and swaying of the work, both of which are now incident to said tilting, are substantially prevented.

The end surfaces 33 and 34 will constitute driving surfaces for engagement by the usual driving wheels or driving dogs and will constitute a firm and solid surface for the engagement of such members.

Said driving surfaces 33 and 34, together with the internal shoulders 12 and 13, can be readily machined without material additional cost, to assure the accurate spacing of these respective surfaces for the reasons and purposes above set forth.

In Figure 7 there is shown in an enlarged scale the manner of mounting the trolley wheel shaft 35. There is provided through an arm, as the arm 3, an opening 36 for the reception of a cylindrical retainer 37. An opening 38, having its sides substantially parallel to the supporting rail, that is, to the axis of the central opening, is provided of width sufficiently greater than that of the shaft 35 to permit the passage of said shaft therethrough but smaller than the diameter of the retainer 37. Thus, when the shaft 35 is solidly seated by a suitable shoulder against the arm 3 and the nut 39 solidly drawn up against the cylindrical retainer 37, the said shaft will be held firmly in position and said retainer 37 cannot escape from the opening 36. However, when it is desired to remove the trolley wheel from the trolley assembly, it is necessary only to back off the nut 39 sufficiently to permit the retainer 37 to be moved out of the opening 36 whereupon the shaft may be moved through the opening 38 and the entire shaft assembly accordingly withdrawn. This facilitates the replacement of trolley wheel assemblies and it will be noted that, since the opening 38 is parallel with the rail, this may be done without the necessity of removing said trolley assembly from operating position in the conveyor. Under certain conditions, it may even be done while the conveyor is in motion.

It will be noted that at various points in the foregoing specification that the words "upper" and "lower" and other words indicating position with respect to the vertical or horizontal have been used. It will be understood that such designations have been used solely for the purpose of convenience in description of the embodiment shown in the drawings and that such terminology is not restrictive. Instead, it will be apparent that many of the objectives of the invention may still be attained with the cable engaging portion of the apparatus in a variety of positions including sidewise and inverted as compared to the position shown herein.

Accordingly, we have set forth and described a device that is capable of meeting the objects and purposes above set forth.

While a specific embodiment of our invention is here utilized for illustrative purposes, it will be understood that many modifications thereof may be made without departing from the purposes of all phases of the invention and that the hereinafter appended claims are to be interpreted to cover such variations excepting as by their own terms expressly limited otherwise.

We claim:

1. In a cable-type conveyor means for holding adjacent ends of a pair of cable ends, said cables having substantially cylindrical enlargements on their respective ends, the combination comprising: a substantially rectangular integral body part having substantially parallel side faces and substantially parallel end faces; an upwardly opening U-shaped slot adjacent each end of said body part of width substantially equal to the width of said cables and a further upwardly opening slot intermediate said end slots of width slightly greater than the diameter of said enlargements, the juncture between said end slots and said central slot forming right angular shoulders said openings extending through the upper wall of said body part; a locking member having end portions of width slightly less than the width of said end slots and a central portion of width slightly less than the width of said central slot, said locking member having mutually facing shoulders on the underside thereof each respectively aligned with the shoulders in said body part when said locking member is received within the slots within said body part; a threaded device extending between the portions of said body part on each side of said central slot for holding said locking member in operating position and for simultaneously drawing said portions toward each other; and a pair of upwardly extending trolley wheel supporting arms, said arms extending from the portions of said body part on opposite sides of said central opening.

2. In a cable-type conveyor for supporting a load on a flanged beam wherein adjacent ends of said cable are enlarged, a cable engaging device engageable with adjacent ends of said cable, comprising in combination: an enlongated, integral main body part, said body part having an upwardly opening, substantially U-shaped slot formed through the upper wall thereof and extending from one axial end of said body part to the other end thereof; means providing a pair of longitudinally spaced, internal shoulders within said slot intermediate the ends thereof; a locking member within said slot and having end portions whose walls mate with the walls of said slot to define openings for receiving said cable therebetween, said locking member having a pair of spaced, internal shoulders, each of said shoulders being aligned with a shoulder on said main body part, the enlarged ends of said cable fitting between said spaced, aligned shoulders and abutting thereagainst; means extending between the portions of said body part on either side of said slot for holding said locking member within said slot and for simultaneously drawing said portions toward each other; a pair of spaced trolley arms extending upwardly from said cable engaging device adjacent to, and on opposite sides of said beam; a trolley wheel mounted on each of said arms and adapted to ride on a flange on said beam.

3. In a cable-type conveyor for supporting a load on a flanged beam wherein adjacent ends of said cable are enlarged, a cable engaging device engageable with adjacent ends of said cable, comprising in combination: an elongated, integral, main body part, said body part having an upwardly opening, substantially U-shaped slot formed through the upper wall thereof adjacent each end of said body part, said end slots being of substantially the same width as said cable; a further, upwardly opening, central slot between said end slots, of width slightly greater than the diameter of said enlargements, the juncture between said end slots and said central slot forming shoulders against which said enlargements are adapted to abut; a locking member received within the slots in said body part, said locking member having end portions of width slightly less than the width of said end slots and a central portion of width slightly less than the width of said central slot, said locking member having mutually facing shoulders on the under side thereof, each respectively aligned with the shoulders in said body part; a threaded device extending between the portions of said body part on each side of said central slot for holding said locking member within said slot and for simultaneously drawing said portions toward each other; a pair of upwardly extending trolley wheel supporting arms, said arms extending from portions of said body part on opposite sides of said central opening; a pair of coaxial openings through the upper ends of said arms; a cylindrical retainer within said openings, each retainer having a central opening therethrough; a shaft extending through each of said central openings; a trolley wheel supported on each of said shafts; means on said shafts and axially movable therealong for preventing axial movement of said retainers along said shafts; said last-mentioned means being removable for permitting movement of said retainers along said shafts; a slot in each of said arms of width less than the external diameter of said retainer and greater than the diameter of said shaft, and extending in a direction parallel with the longitudinal axis of said beam, said slot extending from said opening through one edge of said arm.

References Cited in the file of this patent

UNITED STATES PATENTS

| | | |
|---|---|---|
| 543,183 | Jones | July 23, 1895 |
| 1,134,136 | Kashian | Apr. 6, 1915 |
| 1,294,813 | Lammert et al. | Feb. 18, 1919 |
| 1,921,109 | Webb et al. | Aug. 8, 1933 |
| 2,372,199 | Hassler | May 27, 1945 |
| 2,490,682 | Freeman | Dec. 6, 1949 |
| 2,494,009 | Sharp | Jan. 10, 1950 |
| 2,604,974 | Daigle | July 29, 1952 |
| 2,624,449 | Williams | Jan. 6, 1953 |
| 2,633,226 | Vogt | Mar. 31, 1953 |
| 2,646,872 | Daigle | July 28, 1953 |